US009314694B2

(12) United States Patent
Nadel et al.

(10) Patent No.: US 9,314,694 B2
(45) Date of Patent: Apr. 19, 2016

(54) INTEGRATED DIGITAL PLAY SYSTEM

(71) Applicant: 8 Leaf Digital Productions Inc., Vancouver (CA)

(72) Inventors: Ryan Nadel, Vancouver (CA); Paige Lea Johnson, Collinsville, OK (US); Bryant Drew Jones, Vancouver (CA); Salvia Dhall, Surrey (CA); Michael Hershfield, New York, NY (US)

(73) Assignee: 8 LEAF DIGITAL PRODUCTIONS INC., Vancouver (CA)

( * ) Notice: Subject to any disclaimer, the term of this patent is extended or adjusted under 35 U.S.C. 154(b) by 69 days.

(21) Appl. No.: 14/356,095

(22) PCT Filed: Nov. 5, 2012

(86) PCT No.: PCT/US2012/063589
§ 371 (c)(1),
(2) Date: May 2, 2014

(87) PCT Pub. No.: WO2013/067522
PCT Pub. Date: May 10, 2013

(65) Prior Publication Data
US 2014/0349752 A1    Nov. 27, 2014

Related U.S. Application Data

(60) Provisional application No. 61/555,884, filed on Nov. 4, 2011.

(51) Int. Cl.
*A63F 13/30*    (2014.01)
*A63F 13/20*    (2014.01)

(52) U.S. Cl.
CPC .............. *A63F 13/12* (2013.01); *A63F 13/06* (2013.01); *A63F 2300/105* (2013.01); *A63F 2300/60* (2013.01); *A63F 2300/69* (2013.01)

(58) Field of Classification Search
USPC ........................................... 463/31
See application file for complete search history.

(56) References Cited

U.S. PATENT DOCUMENTS

| 6,350,199 B1* | 2/2002 | Williams et al. ............... 463/16 |
| 2006/0167649 A1 | 7/2006 | Alexander et al. |
| 2009/0005140 A1 | 1/2009 | Rose et al. |

(Continued)

FOREIGN PATENT DOCUMENTS

| JP | 2009095404 A | 5/2009 |
| JP | 2011167549 A | 9/2011 |

(Continued)

OTHER PUBLICATIONS

Wayne Piekarski, Interactive 3D Modelling in Outdoor Augmented Reality Worlds, Feb. 1, 2004, pp. 51-54, http://www.tinmith.net/wayne/thesis/piekarski-thesis.pdf.

*Primary Examiner* — Pierre E Elisca
(74) *Attorney, Agent, or Firm* — GableGotwals

(57) ABSTRACT

An integrated digital play system made according to the present invention provides a multi media, digitally integrated play environment that incorporates mobile device content and web based content which interacts with physically installed tags. The system includes means for identifying a fixed physical structure within a first play system; means for detecting a physical movement of a user relative to the fixed physical structure; a first computer means for combining the physical structure identification data and the user physical movement data to generate one or more motion points; and a second computer means for providing a virtual embodiment of the one or more motion points within a second play system. Because the first and second play systems are different play systems, the second play system does not require certain corresponding user motions in the first play system in order to perform in or progress through the second play system.

19 Claims, 10 Drawing Sheets

(56) References Cited

U.S. PATENT DOCUMENTS

| | | | |
|---|---|---|---|
| 2009/0221368 A1* | 9/2009 | Yen | A63F 13/10 463/32 |
| 2010/0103075 A1 | 4/2010 | Kalaboukis et al. | |
| 2012/0178530 A1* | 7/2012 | Taoka | A63F 13/10 463/31 |
| 2013/0215043 A1* | 8/2013 | Olomskiy | G06F 3/0481 345/173 |
| 2013/0244778 A1* | 9/2013 | Barclay | G07F 17/3227 463/31 |
| 2014/0094278 A1* | 4/2014 | Abouchar | G07F 17/3281 463/25 |
| 2015/0339884 A1* | 11/2015 | Chun | G07F 17/3276 463/25 |

FOREIGN PATENT DOCUMENTS

| | | |
|---|---|---|
| WO | 2009095283 A2 | 8/2009 |
| WO | 2009138547 A1 | 11/2009 |
| WO | 2011129907 A1 | 10/2011 |
| WO | 2012093950 A2 | 7/2012 |

* cited by examiner

INTEGRATED DIGITAL PLAY SYSTEM

CROSS-REFERENCE TO RELATED APPLICATIONS

This application is the United States National Phase of PCT Patent Application No. US2012/063589 filed on 5 Nov. 2012, which claims priority to U.S. Provisional Application No. 61/555,884 filed 4 Nov. 2011 which is incorporated herein by reference.

BACKGROUND OF THE INVENTION

The present invention is in the field of playground systems and video game systems. More particularly, the invention relates to digitally integrated playground and play-structure systems.

There are only a few inventions in the area of digitally-integrated playground systems. None involve the use of mobile computing devices for motion analysis and feedback, nor do they integrate physical play with a virtual game system. Instead, these inventions detect the motion of equipment, not of a user. For example, US Pat. Appl. Pub. No. 2009/0197740 utilizes a physically installed 'processing unit' which receives signals from playground equipment. Motion sensors reside on the playground equipment, sensing motion of the equipment not that of the user. US Pat. Appl. Pub. No. 2009/0105001 also uses sensors attached to the playground equipment to detect equipment motion and generate acoustical tones. It provides no other feedback to the user.

A need exists for a play structure system that allows the user to interact with a fixed physical play structure, detects the motion of a user relative to that play structure, connects that motion to a virtual world or game system, and helps motivate the user to physically play on the play structure for a predetermined amount of time or move between different play structures within a predetermined amount of time.

SUMMARY OF THE INVENTION

An integrated digital play system made according to the present invention provides a multi media, digitally integrated play environment that incorporates mobile device content and web based content which interacts with physically installed tags. In a preferred embodiment, these tags reside on one or more pieces of playground equipment. In this embodiment, the system can be integrated with playground equipment that is already in place as well as with new equipment that is designed and manufactured for intentional integration with the system. In other embodiments, the tags could be installed on building parts, landscape features, or other physical components in both interior and exterior settings (e.g., furniture, rooms, walls, trees, sidewalks, fencing, playground equipment). The system also produces, tracks and analyzes data from the play session in the physical space and synchronizes this data with networked analysis, feedback, and display in the virtual space.

The innovation of the system is in the linkage of tagged physical structures, mobile computing devices and networked computing devices to form an integrated digital play system that tracks and responds to physical motion of a user.

The system includes but is not limited to hardware attachments designed to fit on physical structures including, but not limited to, playground equipment. The hardware attachments function as tags which interact with a custom designed software application running on a mobile computing device. The tagging technology may include but is not limited to QR (Quick Response) codes, augmented reality, RFID (radio frequency identification) or NFID (near field identification).

The software application provides feedback based on user interactions with the tags and user movement data. User movement data may include but is not limited to accelerometer and/or GPS readings from the mobile computing device. Alternatively, user movement data could be collected by a sensor attachment that attaches to the body of the user and transmits data to the mobile computing device. Both user interactions with the tags and user movement data are synchronized with a networked database.

The software application analyzes the tag interaction and/or movement data to generate numeric "motion points." The motion points derived from the physical space may be used within game play structures and reward systems in the virtual space. These game play structures and reward systems may reside on both the mobile computing device and on networked, non-mobile computing devices. A preferred embodiment of this system would be a virtual world where player accomplishments and status are impacted by the motion points gained through physical play on the playground.

Objects of this invention are to: (1) provide an interactive device for play which does not detract from normal physical play; (2) use a virtual play system as a motivator for physical movement in a physical (real world) play system, the virtual play system being a different play system than the physical play system; (3) encourage turn-based play in physical play; and (4) permit a user to turn any physical structure or set of structures into a physical play system which connects to one or more virtual play systems.

ELEMENTS USED IN THE DRAWINGS AND DETAILED DESCRIPTION

10 Integrated digital play system
20 Tags (e.g., QR (Quick Response) codes, augmented reality, RFID (radio frequency identification) or NFID (near field identification) installed on or integrated with a physical play structure or equipment.
30 Physical play structure or equipment.
40 Software application which interfaces with the tags through a mobile computing device. The software application provides game structures which represent a second play system and feedback to physical activities. The software application uses accelerometer data to track user movement.
50 User movement and tag interactions are translated into motion points that reward physical activity and use of the play structure or equipment.
60 Networked online database.
70 Data collected by the mobile device are synchronized with a networked online database and an online virtual world that incorporates the motion points into a video game or second play system different than the first play system.

DETAILED DESCRIPTION OF THE PREFERRED EMBODIMENTS

Figure 1:
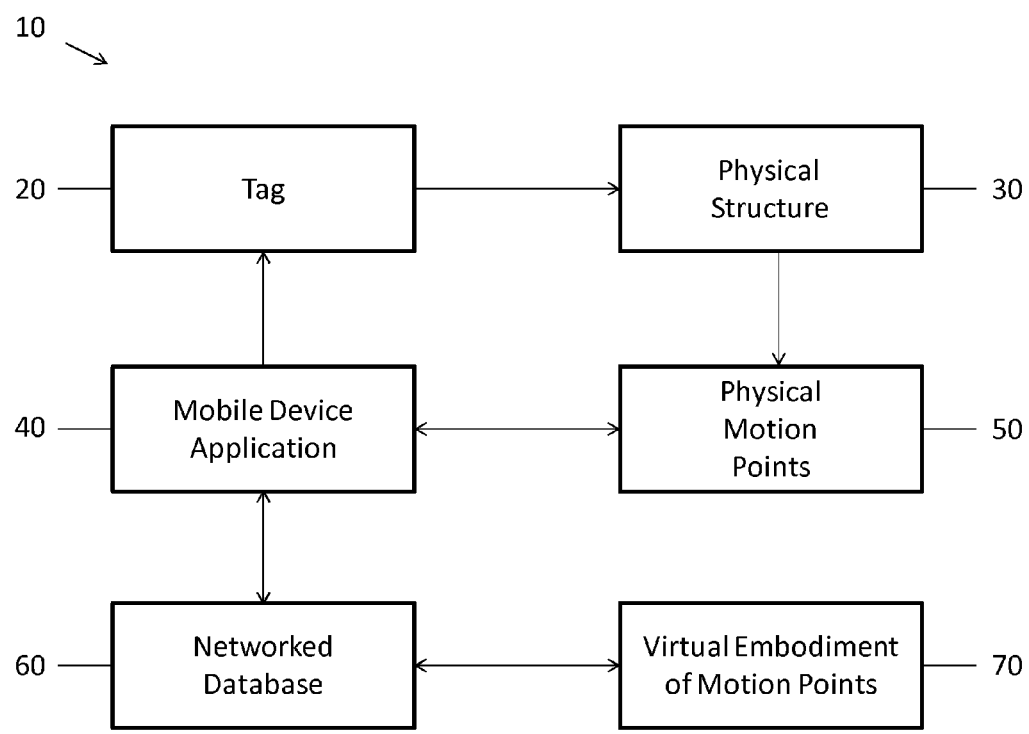
FIG. 1 is a flowchart detailing the order of operations of a preferred embodiment of an digital play system made according to this invention.

Referring to the drawings and first to FIG. 1, an integrated digital play system 10 made according to this invention includes means (e.g., tags 20) for identifying a fixed physical structure 30 within a first play system, means (e.g., an accelerometer or global positioning system located within a mobile computing device 40) for detecting a physical movement of a user relative to the fixed physical structure 30, a first computer means (e.g., a software application running on mobile computing device 40) for combining the physical structure identification data and the user physical movement data to generate one or more motion points 50; and a second computer means (e.g., the same software application running on mobile computing device 40 or on a networked database 60) for providing a virtual embodiment 70 of the one or more motion points 50 within a second play system. The integrated digital play system 10 collects identification data associated with a fixed physical structure 30 within a first play system or space and physical motion data associated with a user in that first play space, combines the identification data and physical motion data to generate one or more motion points 50, and provides a virtual embodiment 70 of the one or more motion points within a second play system.

Figure 2:
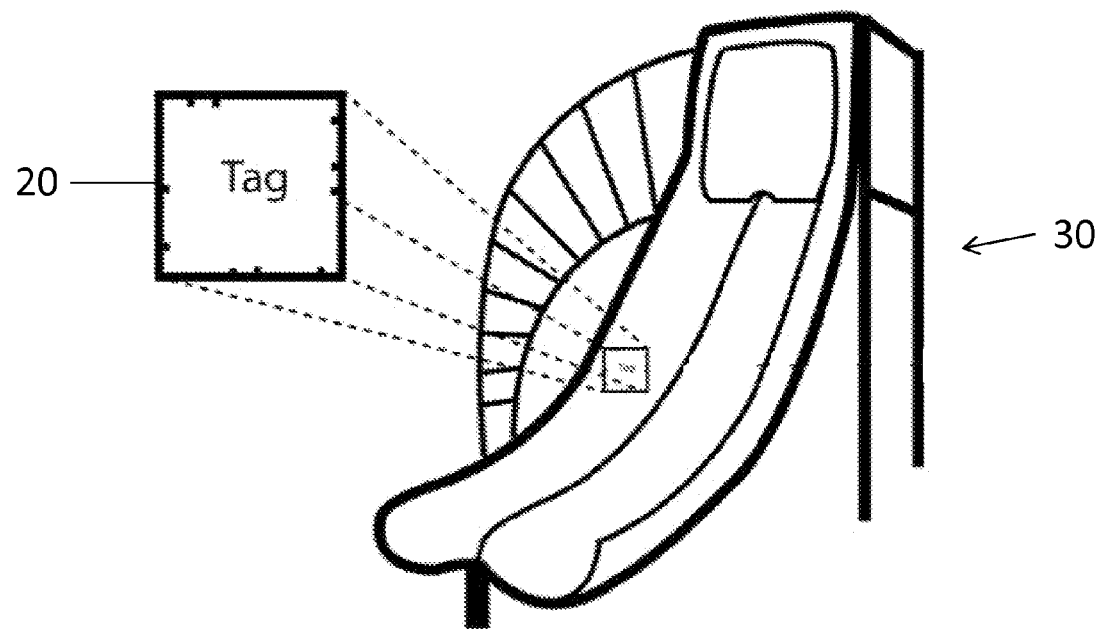
FIG. 2 is a drawing of the tag of FIG. 1 integrated with one of the play structures of FIG. 1.

Referring to FIG. 2, the means for identifying a fixed physical structure 30 is a physical tag 20 either permanently or removably affixed to the physical structure 30. The tag 20 may be any appropriate tagging technology, including but not limited to, a quick response ("QR") code, an augmented reality card, a radio-frequency identification ("RFID") tag, or a near field identification ("NFID") tag. The physical structure 30 can be any structure on which a user could climb, slide, swing, ride, balance, or pull or push against.

The means for detecting physical movement of the user may be an accelerometer or global positioning system, which may be included in a mobile computing device 40. Alternatively, user movement data could be collected by a sensor attachment that attaches to the body of the user and transmits data to the mobile device 40. Both user interactions with the tags 20 and user movement data are synchronized with a networked database 60.

The first computer means, such as a software application running on the mobile computing device 40, combines the physical structure data collected by the tagging technology with the user physical movement data to generate one or more motion points 50. The motion points 50 derived from the physical space may be used within game play structures and reward systems in the virtual space. These game play structures and reward systems may reside on both the mobile computing device 40 and on networked, non-mobile computing devices.

The second computer means, which may be the same software application as the first computer means running on either the mobile computing device 40 or the networked, non-mobile computing device, provides a virtual embodiment of the one or more motion points within a second play system. The second play system is a different play system than the first play system.

Figure 3:
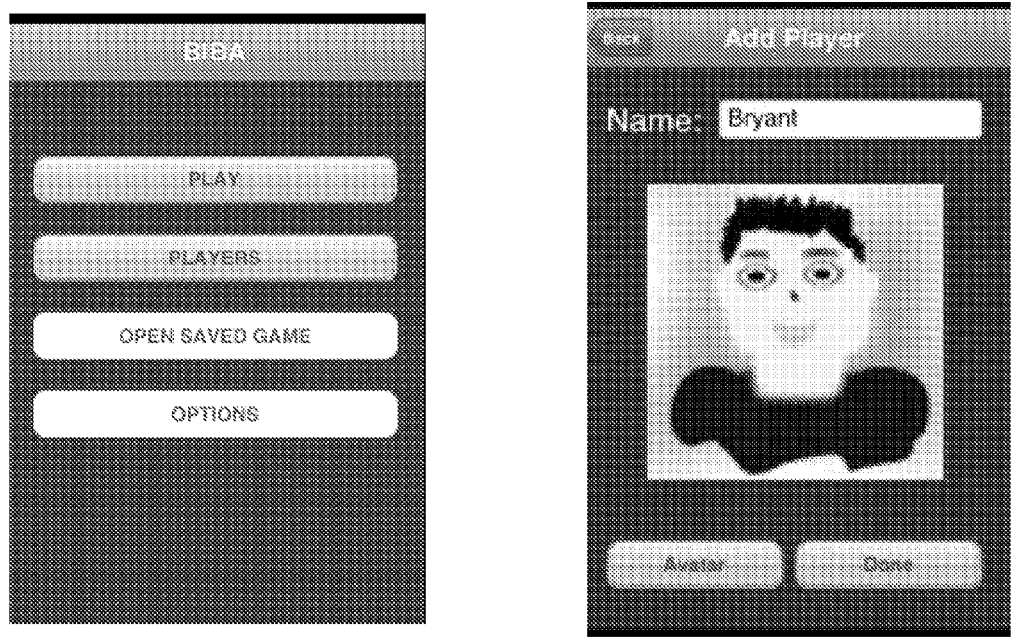
FIG. 3 is a prototype embodiment of a system made according to this invention. Each player selects an avatar that represents the player in a virtual or second play system housed within a mobile device.
Figure 4:
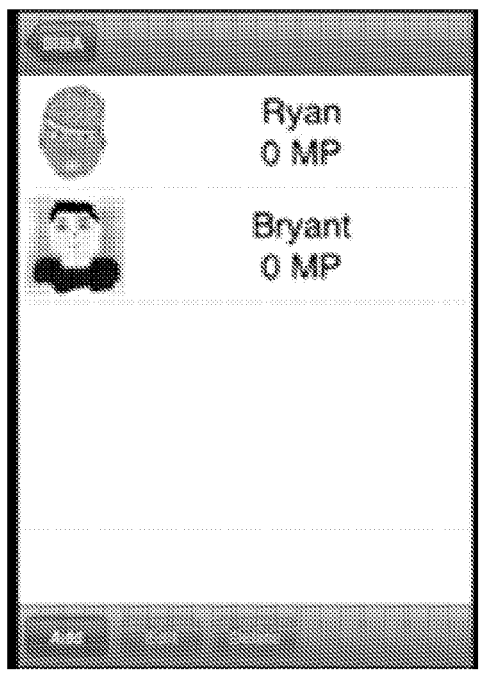
FIG. 4 is the prototype embodiment of FIG. 3 in which the player earns points in the second play system for the player's physical movement in a physical or first play system.
Figure 4:
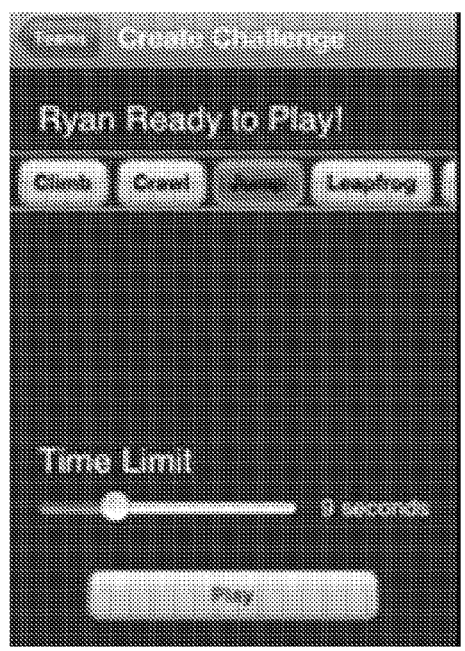
Figure 5:
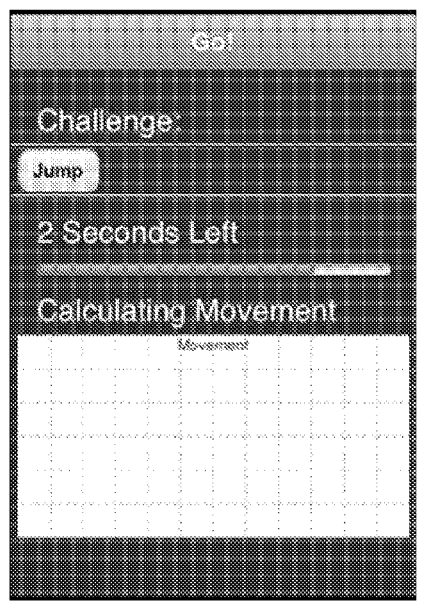
FIG. 5 is the prototype embodiment of FIG. 4 in which the player is presented a challenge to perform in the first play system in order to earn points in the second play system.
Figure 5:
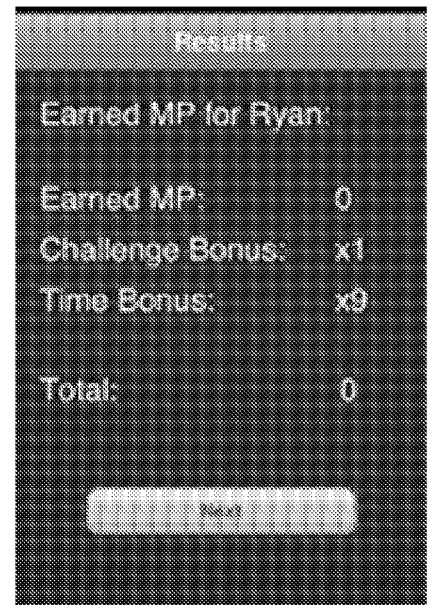

Referring now to FIGS. 3 to 5, in an experiment of the system conducted by the inventors, a software application containing the second play system was loaded onto a mobile cell phone. The second play system was a time trial game that instructed players to move from one piece of playground equipment to another while scanning the tag on the equipment within a set period of time. A user carrying the mobile computing device entered the first play system which included a playground slide having a QR tag attached to it. After launching the software application on the mobile computing device, the software scanned the tag and began collecting data on the user's physical movement. The software interpreted the raw data captured by the accelerometer sensors on the mobile computing device and interpreted these data in the form of motion points. Those motion points were then used to update the user's status within the time trial game.

Figure 6:
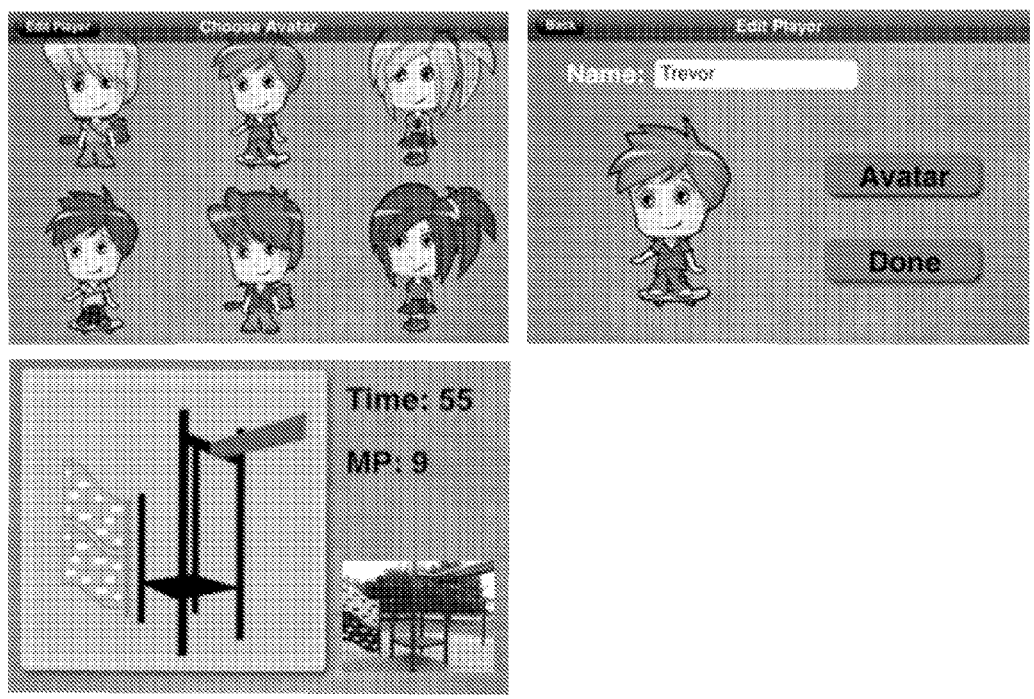
FIG. 6 is another prototype embodiment of a system made according to this invention. Each player selects an avatar and, after scanning a tag installed on or integrated with play structure or piece of playground equipment in the first play system, is presented with a challenge relative to that piece of equipment.
Figure 7:
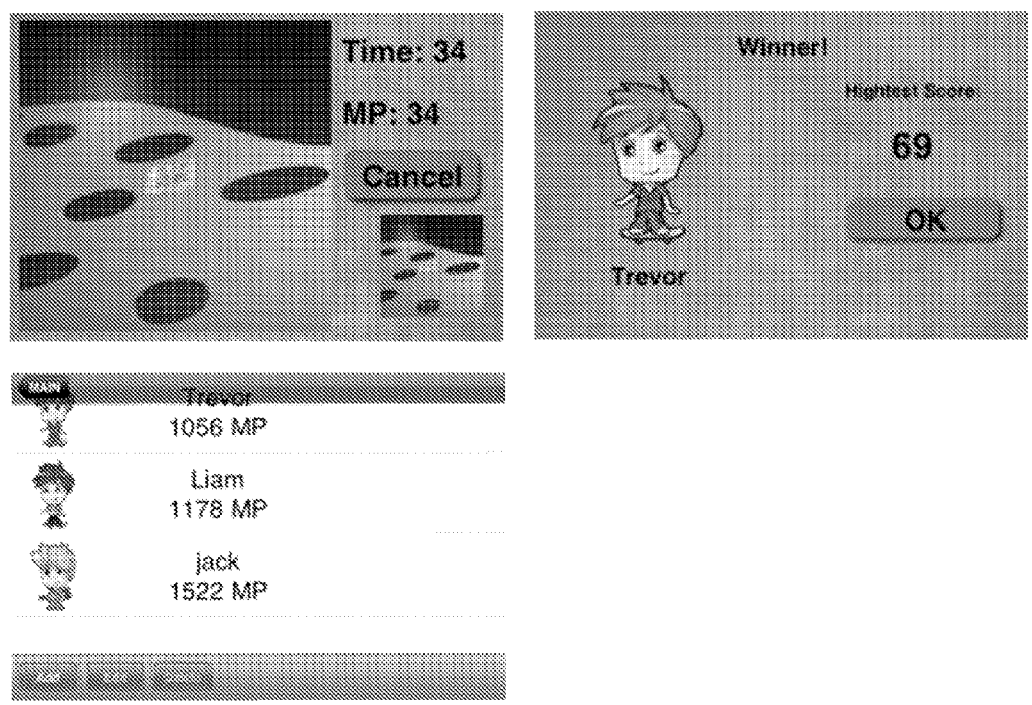
FIG. 7 continues the embodiment of the system of FIG. 6. The player's performance in the first play system determines the player's performance in the second play system.

FIGS. 6 and 7 provide another prototype embodiment of a system made according to this invention. Each player selects an avatar and, after scanning a tag installed on or integrated with play structure or piece of playground equipment in the first play system, is presented with a challenge relative to that piece of equipment. The player's performance in the first play system determines the player's performance in the second play system.

Figure 8:
FIG. 8 is an example of a system made according to this invention in which a playground structure is used as the first play system. As the player moves through the first play system and meets certain challenges defined by the second play system, the player captures monsters in the second play system.
Figure 9:
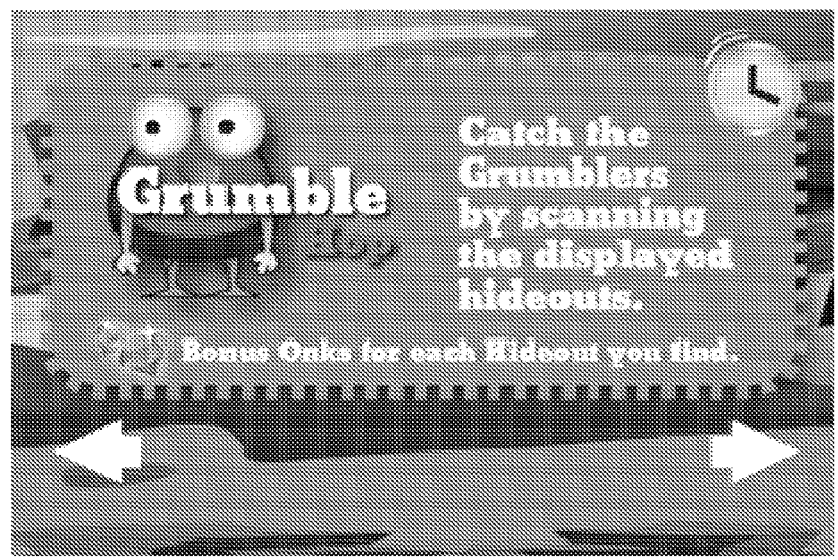
FIG. 9 continues the example of FIG. 8. The player catches "Grumblers" in the second play system by moving through the first play system and scanning the tags of structures corresponding to certain Grumblers.
Figure 10:
FIG. 10 continues the example of FIG. 8. The player is instructed in the second play system to find a specific "Grumbler."

FIGS. 8 to 10 provide another example of a system made according to this invention in which a playground structure is used as the first play system. The player catches "Grumblers" in the second play system by moving through the first play system and scanning the tags of structures corresponding to certain Grumblers. The player may be instructed in the second play system to find a specific "Grumbler."

Figure 11:
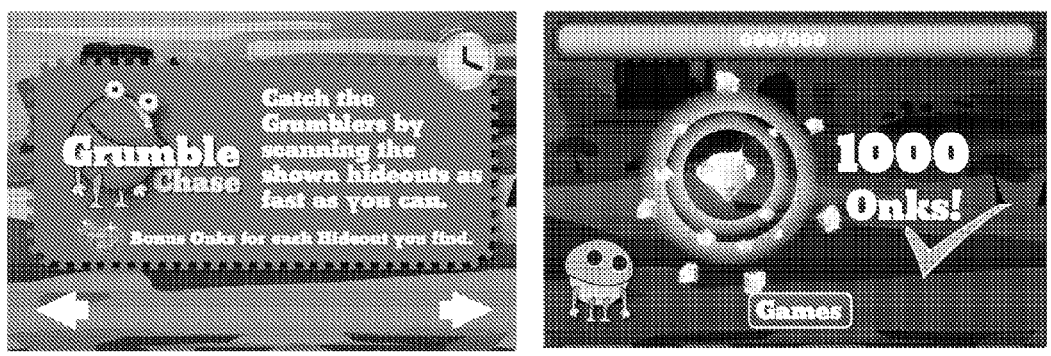
FIG. 11 provides yet another example of the type of game that can be played with the structure of FIG. 8. The player catches "Grumblers" and earns "onks" in the second play system by moving through the first play system. Each play structure in the first play system represents a "hiding place" for Grumblers in the second play system.

FIG. 11 provides yet another example of the type of game that can be played with the structure of FIG. 8. The player catches "Grumblers" and earns "onks" in the second play system by moving through the first play system. Each play structure in the first play system represents a "hiding place" for Grumblers in the second play system.

An integrated digital play system made according to this invention, therefore, is very different than digital game systems like the WII® game system (Nintendo of America Inc, Redmond, Wash.), KINECT™ game system (Microsoft Corp., Redmond, Wash.), or their equivalent. Game systems such as the WII and KINECT rely upon gestural interfaces whereas the integrated digital play system disclosed herein captures and uses player movement, not player gestures. Additionally—and unlike those other play systems—the second play system (e.g., the time trial game) is not a virtual representation of the first (e.g. the physical playground), and does not require certain corresponding user motions in the first play system in order to perform in or progress through that virtual representation. In other words, a user does not slide down a playground slide or simulate sliding down the playground slide in the first play system in order to watch a virtual representation of him- or herself slide down a virtual embodiment of a playground slide in the second play system. Additionally, the system does not require use of a controller or game console in combination with a prescribed range of user motions in order to play in the second play system.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

What is claimed is:

1. An integrated digital play system comprising:
   means for identifying at least one physical play structure within a first play system having two or more physical play structures, the identified play structure being a piece of playground equipment and providing a first play activity;
   means for detecting a physical movement of a user during the first play activity relative to the identified play structure;
   a first computer means for recording one or more motion points of the user during the first play activity relative to the identified play structure; and
   a second computer means for mapping the one or more motion points within a second play system, the second play system being a virtual play system representing a second play activity different than the first play activity;
   the piece of playground equipment being selected from the group consisting of balancing equipment, climbing equipment, jumping equipment, riding equipment, sliding equipment, spinning equipment, and swinging equipment.

2. An integrated digital play system according to claim 1 further comprising at least one of the first and second computer means including a networked data base.

3. An integrated digital play system according to claim 1 further comprising at least one of the first and second computer means being a mobile device.

4. An integrated digital play system according to claim 1 further comprising the means for identifying the play structure communicating with a mobile device.

5. An integrated display system according to claim 1 further comprising the means for detecting physical movement residing within a mobile device.

6. An integrated digital play system according to claim 1 further comprising at least one of the first and second computer means including a software program.

7. An integrated digital play system according to claim 1 further comprising the means for identifying a physical structure attached to the play structure.

8. An integrated digital play system according to claim 1 further comprising the means for identifying the play structure being a physical tag.

9. An integrated digital play system according to claim 8 further comprising the physical tag being selected from the group consisting of a quick response code, an augmented reality card, a radio-frequency identification tag, and a near field identification tag.

10. An integrated digital play system according to claim 1 further comprising the means for detecting physical motion being an accelerometer.

11. An integrated digital play system according to claim 1 further comprising the means for detecting physical motion being a global positioning system.

12. An integrated digital play system according to claim 1 wherein the second play system is a different play system than the first play system.

13. A method of integrated digital play comprising the steps of:
   collecting identification data associated with at least one physical play structure providing a first play activity within a first play space, the play structure being a piece of playground equipment;
   collecting physical motion data associated with a user in the first play space relative to the play structure during the first play activity;
   recording one or more motion points of the collected physical motion data relative to the play structure during the first play activity; and
   providing a second play system, the second play system being a virtual play system providing a second play activity different than the first play activity and having a virtual play structure different than the at least one physical play structure; and
   advancing the user within the second play activity using the one or more motion points generated in the first play activity;
   wherein the piece of playground equipment is selected from the group consisting of balancing equipment, climbing equipment, jumping equipment, riding equipment, sliding equipment, spinning equipment, and swinging equipment.

14. An integrated digital play system for simultaneous virtual and physical activity, the system comprising:
   a multimedia device; and
   a software application;
   wherein the multimedia device runs the software application;
   wherein the software application displays a virtual activity and an instruction for a user to perform a physical activity on a piece of playground equipment, the virtual activity and the physical activity being non-analogous activities and representing non-analogous play spaces;
   wherein the software application receives user input based on physical activity in a first play system and an electronic tag associated with a physical structure in the first play system and generates measurement data as the user performs the physical activity relative to the physical structure in the first play system;
   wherein in response to receiving the measurement data, the multimedia device displays the measurement data as a progression through the virtual activity; and
   wherein the piece of playground equipment being selected from the group consisting of balancing equipment, climbing equipment, jumping equipment, riding equipment, sliding equipment, spinning equipment, and swinging equipment.

15. A system according to claim 14, the system further comprising:
   a server;
   wherein the multimedia device is in periodic communication with the server;
   wherein the multimedia device transmits the measurement data to a database resident on said server, wherein said measurement data is imported into said database;
   in response to receiving the measurement data, the server compares the measurement data to measurement data of a second user, and calculates comparison data; and
   wherein the server transmits the comparison data to the multimedia device and wherein the multimedia device displays the comparison data.

16. A system according to claim 14 wherein a user motion in the physical activity does not have an identical corresponding motion in the virtual activity.

17. A system according to claim 14 further comprising the electronic tag being selected from the group consisting of a quick response code, an augmented reality card, a radio-frequency identification tag, and a near field identification tag.

18. An apparatus for simultaneous virtual and physical activity, the physical activity providing measurement data of a user for the virtual activity but the physical activity being a different activity than the virtual activity, the apparatus comprising:
   a multimedia device having a software application downloaded from a server;
   means for periodic communication with the server;
   means for displaying an instruction for a user to perform a physical activity on at least one piece of playground equipment;
   means for detecting user input based on the physical activity and an electronic tag attached to the piece of playground equipment;
   means for generating measurement data based on the physical activity and the electronic tag;
   means for transmitting the measurement data to a database resident on said server, wherein said measurement data is imported into the database;
   in response to receiving the measurement data, the server compares the measurement data to measurement data of a second user, and calculates comparison data; wherein the server transmits the comparison data to the multimedia device;
   means for displaying the comparison data; and
   means for advancing at least one of the users in the virtual activity using the measurement data, the virtual activity being different than and non-analogous to the physical activity;
   wherein the piece of playground equipment is selected from the group consisting of balancing equipment, climbing equipment, jumping equipment, riding equipment, sliding equipment, spinning equipment, and swinging equipment.

19. An apparatus according to claim 18 further comprising the electronic tag being selected from the group consisting of a quick response code, an augmented reality card, a radio-frequency identification tag, and a near field identification tag.

* * * * *